United States Patent [19]

Mettenbrink

[11] Patent Number: 4,545,510
[45] Date of Patent: Oct. 8, 1985

[54] DISPENSER FOR FLOWABLE SUBSTANCES

[75] Inventor: Herbert Mettenbrink, Lohne, Fed. Rep. of Germany

[73] Assignee: Bramlage GmbH, Lohne, Fed. Rep. of Germany

[21] Appl. No.: 424,655

[22] Filed: Sep. 27, 1982

[30] Foreign Application Priority Data

Dec. 31, 1981 [DE] Fed. Rep. of Germany ... 8138264[U]

[51] Int. Cl.⁴ .............................................. B65D 47/34
[52] U.S. Cl. ..................................... 222/209; 222/211
[58] Field of Search ............... 222/209, 211, 212, 215, 222/207, 383

[56] References Cited

U.S. PATENT DOCUMENTS

| | | | |
|---|---|---|---|
| 2,979,236 | 4/1961 | Fahr | 222/211 X |
| 3,323,689 | 6/1967 | Elmore | 222/209 X |
| 3,752,366 | 8/1973 | Lawrence, Jr. | 222/209 X |
| 4,098,434 | 7/1978 | Uhlig | 222/212 X |
| 4,154,371 | 5/1979 | Kolacinski et al. | 222/212 |
| 4,394,939 | 7/1983 | Thor et al. | 222/383 X |

FOREIGN PATENT DOCUMENTS 1210149 2/1966 Fed. Rep. of Germany .
2344469 3/1977 France .

*Primary Examiner*—Stanley H. Tollberg
*Attorney, Agent, or Firm*—Martin A. Farber

[57] ABSTRACT

A dispenser for flowable substances with an elastically resilient squeeze head arranged on a dispenser housing has a valve nozzle-opening. A suction tube extends from the bottom of the squeeze head down to the bottom of the dispenser housing, the tube having an opening communicating with the interior of the squeeze head, and a non-return valve for closing the opening.

21 Claims, 1 Drawing Figure

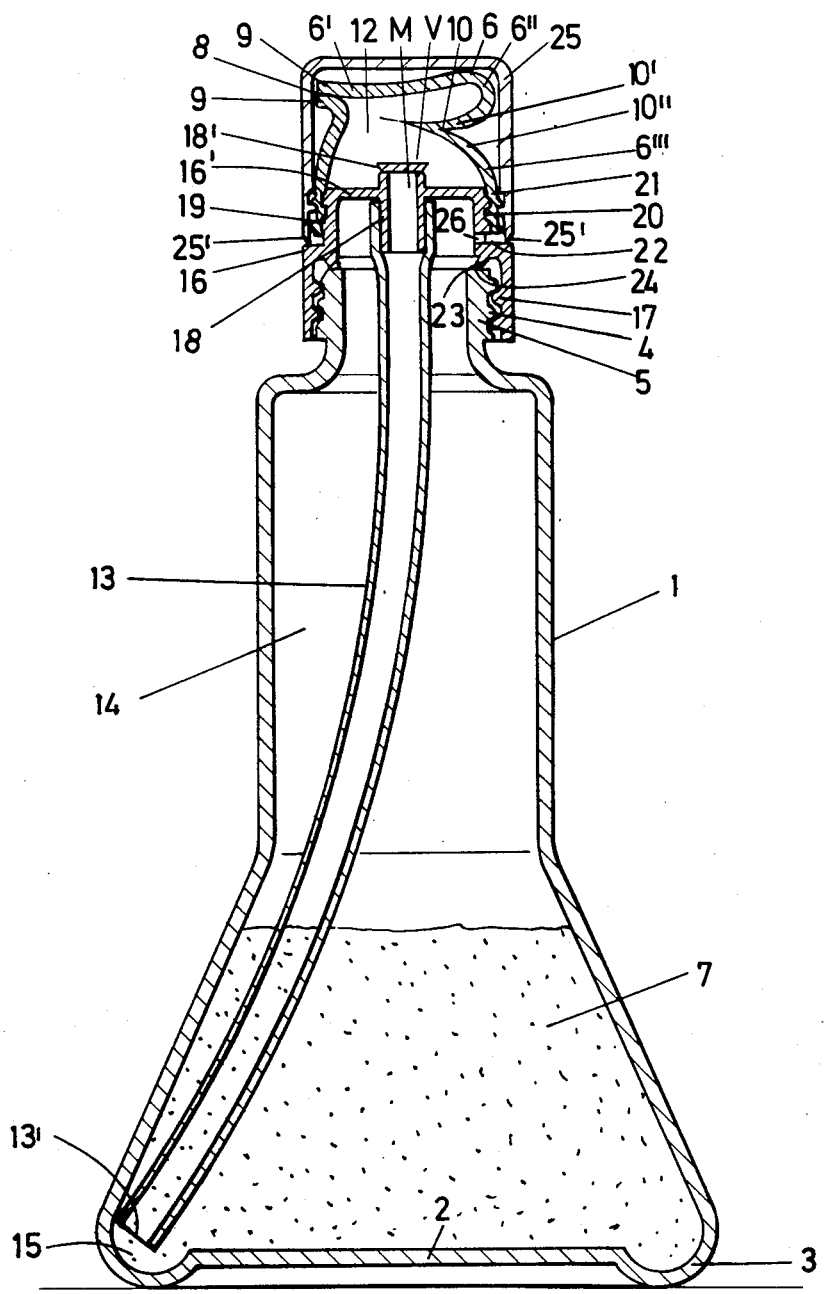

DISPENSER FOR FLOWABLE SUBSTANCES

The present invention relates to a dispenser for flowable substances, having an elastically resetting squeeze head with a valve nozzle-opening which is arranged on a dispenser housing.

One dispenser of this type is known from West German OS No. 12 10 149. In that case, however, use is made of a piston which is blocked against return movement and moves within the cylindrical housing over the filling column itself. This arrangement does function with pasty substances; however, flowable substances cannot be retained without loss. Furthermore, the known dispenser has a large number of parts and is expensive to assemble.

The object of the present invention is to create a dispenser of this type which is simpler in construction, requires fewer parts, and furthermore permits dispensing of even highly flowable substances without loss.

This object is achieved by the invention by the features set forth in the claims.

As a result of this development a dispenser which is simple to manufacture and advantageous in use is obtained. The dispensing mechanism is no longer restricted to a specific housing, i.e. it is no longer necessary to start from a cylindrical housing which precisely guides a given piston. Rather, the dispenser mechanism can be applied practically to any container whatsoever since delivery is effected through a suction tube which extends into the container. This tube, which acts as a riser, extends down to the bottom of the dispenser housing. On its squeeze-head end, the tube is in communication with the interior of the squeeze head. Within this space it is closed by a non-return valve. The valve opens during the restoration of the squeeze head and the drawing up of the fluid which thereby takes place; when the squeeze head is then compressed, the non-return valve closes. The dosaged portion which is now present in the interior of the squeeze head and has been separated from the rest of the supply now passes outwardly through the valve nozzle-opening.

The non-return valve may advantageously be a flutter valve. This valve can be formed during injection molding of the bottom of the squeeze head.

In what is also a structurally simple development, the tube is pushed over a nipple. The nipple extends inwardly towards the dispenser housing from the bottom of the squeeze head, which bottom itself is non-deformable, continues through said bottom into the squeeze-head side and is provided there at its end with the flutter valve. Instead of developing the tube as a separately removable structural part it can, however, also be formed as a part of the nipple.

A structural unit which is easily attached results from a formation of the bottom of the squeeze head as the top of a screw cap for the dispenser housing and the cup-shaped wall of the cap in the region of its top section being formed with a tooth profiling for form-interlocked overlapping of the edge section of the squeeze head around it. Thus, highly flexible material can be used for the squeeze head, thus better satisfying its functional requirements, while firmer material can be used for the cup-shaped screw cap of the dispenser housing. The tooth profiling—a continuous annular rib profiling may also be employed—provides the advantage that the squeeze head can be easily attached. It is furthermore advantageous to locate the toothing on an inwardly recessed step, the opposite inner side of which rests sealingly on the edge of the mouth of the dispenser housing. This inner side can be formed advantageously as an annular lip so that an optimal seal is obtained. The squeeze head, which is made of elastic material, is provided on the side opposite its valve nozzle-opening with a gusset-like transverse fold, the tip of which, extending approximately up to the flutter valve, is directed towards the valve nozzle-opening. This leads to a bellows shape of the squeeze head, without limiting the free space required for the action of the flutter valve. Finally, another advantageous feature is that an air equalization opening is provided within the step, which opening can be closed, for instance, by an outer screw cap.

With the above and other objects and advantages in view, the present invention will become more clearly understood in connection with the detailed description of a preferred embodiment, when considered with the accompanying drawing, of which:

The dispenser housing 1, which is shown in vertical cross section, has the shape of a flask which, at about half its height, widens out downwardly in frustoconical shape and forms a standing rim 3 on the periphery of the somewhat inwardly drawn bottom 2.

The upper, substantially cylindrical section of the dispenser housing 1 continues into a neck 5 which is provided with an outer thread 4. The neck carries a squeeze head 6 formed of elastically resilent material. This head is part of a dispenser mechanism which delivers the substance 7 in individual portions.

The squeeze head 6, which is made of rubber or suitable plastic, has a valve nozzle-opening 8 on its side below its top 6'. The lips of said opening, which come firmly together and close the nozzle-opening, are designated 9.

The squeeze head has a bellows-like structure. It has a gusset-like transverse fold 10 on the side opposite the valve nozzle-opening 8. This fold extends at the mid-height of the squeeze head 6, which is formed substantially in the shape of a dome. The wall 10' of the fold which extends from above and therefore comes from the top 6' forms at the top a rounding 6" which is close to the edge. The other wall 10" of the fold extends from the tip of the gusset in the shape of a larger arc 6'" downwardly into the lower edge region 21 of the squeeze head.

The interior 12 of the squeeze head is in communication via a suction tube 13 with the inside 14 of the dispenser housing 1. The tube, which is open at its bottom end, reaches down to the bottom of the dispenser housing 1 and extends, commencing at the center of the neck 5, in an arc into an annular groove 15 formed by the standing rim 3. The tube opening 13' which is present here thus dips into the very last trace of the substance 7 when the contents are almost all removed.

The suction tube 13 comes from the bottom 16' of the squeeze head. This bottom is developed as the top of a screw cap 16 for the dispenser housing. The screw cap 16 has an internal thread 17 which cooperates with the outer thread 4 on the neck 5 of the dispenser housing.

The bottom 16' of the squeeze head has a hole in its center. A nipple 18 which projects both upwardly and downwardly is formed in said bottom. While the cylindrical section of the nipple 18 which extends in the direction towards the interior 14 of the dispenser housing carries the suction hose 13 which is placed thereon, the section which projects above the top of the bottom 16' of the squeeze head and therefore extends into the interior 12 of the squeeze head is provided with a non-return valve V. This valve is a flutter valve which is connected to the end 18' of the nipple by a film hinge forming a bridge of material.

The surface of the valve seat is also formed by the edge of the end 18' of the nipple. The screw cap 16 is made of basically non-deformable material which, however, in view of the development as a flutter valve, possesses the necessary mobility, in particular due to the aforementioned developement of a film hinge.

The squeeze head 6 is attached to the screw cap 16 of the dispenser housing by insertion. The required fastness of the attachment is obtained by a toothing 20 formed on the cup-shaped wall 19 of the screw cap 16 in the region of its upper peripheral section, which toothing serves for form interlocked overlapping of the lower edge section 21 of the squeeze heat 6, which section 21 has a corresponding mating toothing. Instead of a tooth profiling which is provided only over a short section, the profiling can also be formed as a continuous circumferential annular rib profiling. In such case, for reasons also of an adequate seal between the highly flexible dispenser head 6 and the screw cap 16 which in itself is substantially non-deformable, it is advisable to provide a plurality of annular rib profilings so that a meander-shaped sealing joint is obtained, as shown in the drawing.

As can be noted, the tooth profiling 20 of the screw cap 16 is located in the region of a inwardly offset or recessed step 22 of the screw cap 16. The opposite interior wall of said step is applied, as an annular lip 23, in sealing manner against the edge 24 of the mouth of the dispenser housing 1 or its neck 5. The stepped-down smaller diameter portion of the cup-shaped wall of the screw cap 16 extends vertically in substantially a coaxial extension of the neck 5. The larger diameter portion of the dispenser-housing screw cap 16 adjoins an outer cap 25 of the same outside diameter which can be placed on top. This outer cap has an internal thread which cooperates with the corresponding external thread on the section 21 of the edge of the squeeze head which is adjacent to the step. The edge 25', tapered to lip shape, of the outer cap 25 projects beyond the lower edge of the edge section 21 of the squeeze head. This lip-like pointed edge abuts in sealing manner on the step 22, located in front of it, of the screw cap 16 of the dispenser housing.

In the step 22 there is an air equalization opening 26. It is closed by the outer screw cap 25 so that the material 7 is prevented from running out when the bottle is tipped.

The manner of operation is as follows: For the dispensing of dosaged portions, after the outer cap 25 is removed the squeeze head 6 is compressed approximately perpendicularly to the transverse fold 10 and the air present therein moves out through the valve nozzle-opening 8. The non-return valve V remains closed. After the squeeze head 6 is released, a vacuum develops in the interior 12 of the squeeze head. As a result, the non-return valve V opens. The valve nozzle-opening 8 now remains closed. The vacuum draws material 7 into the interior 12 of the squeeze head via the suction tube 13 and the open valve V. When the inside of the squeeze head is filled with material, the material is then dispensed by another actuation of the squeeze head in individual portions, through the valve nozzle-opening 8.

Upon the first use, repeated pump-like actuation of the squeeze head 6 is, to be sure, necessary. In normal use, a portion of the total supply is, however, always present in the inside 12 of the squeeze head, ready to be dispensed.

The dispensing of the material 7 is practically free of losses since the tube opening 13' lies in the annular groove 15 which is deeper than the inwardly raised bottom 2.

I claim:

1. In a dispenser for flowable substances including, an elastically resilient squeeze head having a valve nozzle-opening and a bottom for said squeeze head, said bottom forming a part of a cup shaped dispenser housing cap arranged on a dispenser housing, and a suction tube extending from an opening in the squeeze-head bottom to a bottom portion of the dispenser housing connecting the bottom portion of the dispenser housing to the squeeze head via a non-return valve, the improvement wherein:

the dispenser housing cap has an offset step-shaped wall including an upper circumferential wall section of relatively smaller cross section which extends into the squeeze head;

the squeeze-head bottom opening is formed through a nipple having a projected portion which projects from the squeeze-head bottom in a direction into the dispenser housing, said nipple continuing above said squeeze head bottom on a squeeze-head side thereof to an end of said nipple;

said non-return valve comprises a flutter valve connected to said nipple;

an upper section of said upper circumferential wall section of said cap is formed with an external tooth profiling constituting means for form-interlocking overlapping engagement with an edge section of said squeeze head;

an upper, substantially cylindrical section of said dispenser housing continues into a neck portion thereof, the latter being formed with an outer thread engaging said cap, the latter constituting a screw cap;

said screw cap further defines an air equalization opening in a region of a step of said offset step-shaped wall of said cap; and an upper cap is positionable over said screw cap, closing said air equalization opening from the outside.

2. The dispenser according to claim 1, wherein said dispenser housing at its top forms an edge defining a mouth opening, said tooth profiling is located in a region of said step, an opposite, interior wall of said step rests in sealing manner against said edge of said mouth opening of said dispenser housing.

3. In a dispenser for flowable substances including, an elastically resilient squeeze head having a valve nozzle-opening and a bottom for said squeeze head, said bottom forming a part of a cup shaped dispenser housing cap arranged on a dispenser housing, and a suction tube extending from an opening in the squeeze-head bottom to a bottom portion of the dispenser housing connecting the bottom portion of the dispenser housing to the squeeze head via a non-return valve, the improvement wherein:

the dispenser housing cap has an offset step-shaped wall including an upper circumferential wall section of relatively smaller cross section which extends into the squeeze head;

the squeeze-head bottom opening is formed through a nipple having a projecting portion which projects from the squeeze-head bottom in a direction into the dispenser housing, said nipple continuing above said squeeze head bottom on a squeeze-head side thereof to an end of said nipple;

said non-return valve comprises a flutter valve connected to said nipple;

said squeeze head is made of elastic material and further comprises:

on a side opposite said valve nozzle-opening, a single gusset-shaped transverse fold forming a point.

4. The dispenser according to claim 3, wherein said nipple and said flutter valve are formed integrally of the same material.

5. The dispenser according to claim 3, wherein said flutter valve is seated on an upper edge of the end of said nipple.

6. The dispenser according to claim 3, wherein said point of said fold extends adjacent said non-return valve and is directed towards said valve nozzle-opening of said squeeze head.

7. The dispenser according to claim 1, wherein said air equalization opening consists of a bore in said first-mentioned cap directly communicating the outside with the inside of said dispenser housing, said bore is spaced from said tooth profiling and said outer thread.

8. The dispenser according to claim 7, wherein said bore is in said upper circumferential wall section and has an axis transverse to that of said nipple.

9. The dispenser according to claim 1, wherein said nipple and said flutter valve are formed integrally of the same material.

10. The dispenser according to claim 1, wherein said flutter valve is seated on an upper edge of the end of said nipple.

11. The dispenser according to claim 1, wherein said suction tube is placed over said projecting portion of said nipple.

12. The dispenser according to claim 1, wherein said bottom of said squeeze head is non-deformable.

13. In a dispenser for flowable substances including, an elastically resilient squeeze head having a valve nozzle-opening and a bottom for said squeeze head, said bottom forming a part of a cup shaped dispenser housing cap arranged on a dispenser housing, and a suction tube extending from an opening in the squeeze-head bottom to a bottom portion of the dispenser housing connecting the bottom portion of the dispenser housing to the squeeze head via a non-return valve, the improvement wherein:

the dispenser housing cap has an offset step-shaped wall including a step and an upper circumferential wall section of relatively smaller cross section which extends to the squeeze head;

the squeeze-head bottom opening is formed through a nipple having a projecting portion which projects from the squeeze-head bottom in a direction to the dispenser housing, said nipple continuing above said squeeze head bottom on a squeeze-head side thereof to an end of said nipple;

said non-return valve comprises a flutter valve connected to said nipple;

said cap further defines an air equalization opening in a region of said step of said offset step-shaped wall of said cap; and an upper cap is positionable over said dispenser housing cap, closing said air equalization opening from the outside.

14. The dispenser according to claim 13, wherein said air equalization opening is formed in said upper circumferential wall section of said dispenser housing cap.

15. The dispenser according to claim 13, wherein said upper cap has a lower edge sealingly engaging said step of said dispenser housing cap.

16. The dispenser according to claim 15, wherein said upper cap releasably is held in engagement with said edge section of said squeeze head.

17. The dispenser according to claim 13, wherein said dispenser housing at its top forms an edge defining a mouth opening, an opposite, interior wall of said step rests in sealing manner against said edge of said mouth opening of said dispenser housing.

18. The dispenser according to claim 16, wherein said dispenser housing at its top forms an edge defining a mouth opening, an opposite, interior wall of said step rests in sealing manner against said edge of said mouth opening of said dispenser housing.

19. The dispenser according to claim 13, wherein said air equalization opening consists of a bore in said first-mentioned cap directly communicating the outside with the inside of said dispenser housing.

20. In a dispenser for flowable substances including, an elastically resilient squeeze head having a valve nozzle-opening and a bottom for said squeeze head, said bottom arranged on a dispenser housing, and a suction tube extending from an opening in the squeeze-head bottom to a bottom portion of the dispenser housing connecting the bottom portion of the dispenser housing to the squeeze head via a non-return valve, the improvement wherein:

the squeeze-head bottom opening is formed through a nipple having a projecting portion which projects from the squeeze-head bottom in a direction to the dispenser housing, said nipple continuing above said squeeze head bottom on a squeeze-head side thereof to an end of said nipple;

said non-return valve comprises a flutter valve connected to said nipple;

said squeeze head is made of elastic material and further comprises:

on a side opposite said valve nozzle-opening, a single gusset-shaped transverse fold forming a point.

21. The dispenser according to claim 20, wherein said point of said fold extends adjacent said non-return valve and is directed towards said valve nozzle-opening of said squeeze head.

* * * * *